United States Patent
Milano et al.

[19]

[11] Patent Number: 5,870,215
[45] Date of Patent: Feb. 9, 1999

[54] COVERT SELECTIVE ACQUISITION DEVICE FOR IDENTIFYING FRIEND OR FOE

[75] Inventors: Steven J. Milano, Nesconset; James S. Herzel, Dix Hills, both of N.Y.

[73] Assignee: Northrop Grumman Corporation, Los Angeles, Calif.

[21] Appl. No.: 577,990

[22] Filed: Dec. 22, 1995

[51] Int. Cl.$^6$ .................................................. H04B 10/00
[52] U.S. Cl. .......................... 359/172; 359/152; 359/159; 342/45
[58] Field of Search .................................. 359/152, 159, 359/172, 169, 170, 155; 342/45

[56] References Cited

U.S. PATENT DOCUMENTS

| | | | |
|---|---|---|---|
| 3,566,126 | 2/1971 | Lang | 359/170 |
| 3,989,942 | 11/1976 | Waddoups | 359/170 |
| 4,218,834 | 8/1980 | Robertsson | 359/170 |
| 4,731,879 | 3/1988 | Sepp et al. | 359/152 |
| 4,888,816 | 12/1989 | Sica, Jr. | 359/152 |
| 5,329,395 | 7/1994 | Endo et al. | 359/159 |
| 5,390,040 | 2/1995 | Mayeux | 359/152 |
| 5,539,565 | 7/1996 | Waddoups et al. | 359/170 |

FOREIGN PATENT DOCUMENTS

| | | | |
|---|---|---|---|
| 2535467 | 10/1974 | France | 359/140 |

*Primary Examiner*—Rafael Bacares
*Attorney, Agent, or Firm*—Terry J. Anderson; Karl J. Hoch, Jr.

[57] ABSTRACT

A compact infrared identification and communication assembly, including a transponder device and at least one interrogator device, is provided. Each device includes a housing having an opening therein through which light may be received or emitted. The opening has a spectral filter mounted therein which permits only a specific frequency band of incident light to pass into and out from the housing. A dichroic beam splitter is mounted in the housing, aligned with the spectral filter, for reflecting and transmitting separate selected portions of the specific frequency band. A photodiode is aligned with the beam splitter, thereby receiving light from one of the separate portions, for example the transmitted portion. The photodiode converts its received light into an electrical signal which is subsequently converted into a form which a user may easily understand, for example an LED display. The devices further include a light emitting diode, which is also aligned with said dichroic beam splitter, for converting a second electrical signal, produced by a user into an emitted light signal. The emitted light signal is of the other separate portion, for example the reflected range.

23 Claims, 5 Drawing Sheets

COVERT SELECTIVE ACQUISITION DEVICE FOR IDENTIFYING FRIEND OR FOE

BACKGROUND OF THE INVENTION

1. Field of the Invention

This invention relates generally to an apparatus for selectively and covertly identifying and communicating with others. More particularly, this invention is directed to a portable apparatus which utilizes a directionally selectable infrared transmitter and receiver assembly for covertly communicating among friendly forces in a military and/or battlefield environment.

2. Description of the Prior Art

A constant concern for individuals engaged in combat is that they might be mistaken for the enemy by their compatriots, and as a result be injured or killed by what is commonly referred to as "friendly fire". In the past, given the technical limitations of weaponry, and the commensurate contained nature of the battle arena, solutions to the potential problem of misidentification were relatively simple.

As the battlefield has spread beyond the visual field and fighting continued into the night, however, the use of such simple devices for identifying friend or foe (IFF devices) as different colored uniforms, equipment, or flags has become ineffective. Modern technologies of war, which permit long range missile assaults and gun battles carried out between tanks and artillery units positioned miles apart, and common sourcing of machines of war, has required the fabrication of more reliable identification means. Unfortunately, the most relied upon means has remained knowing, relaying, and coordinating relative positions of troops by a central command center. A serious inherent weakness of such a system is that forces have to rely on a remote and delayed identification process which is often too slow to respond to an immediate threat or rapidly advancing forces. In addition, with modern radio source identification means, the means by which information is requested from a central command center, by soldiers in the field, often results in the revelation of the soldiers' position.

While it is always the case that the effective use of troops in the field of combat (as well as the skies above) is linked to the command structure, as troop strengths are spread out across larger and larger distances a system based on a command center for identifying other units encountered in the field means that the loss of a command post could render the troops without knowledge of who is friend and who is foe. Established procedures for such contingencies exist, but they often include radio transmissions. This, again, is generally less desirable because field radio transmissions, which are broadcast further and through 360 degrees, may be monitored, jammed, or used in other ways by the enemy to locate the transmitting soldier or soldiers.

In the prelude to the Gulf War, in which a multiplicity of countries were being massed to form a coalition force, with a variety of disparate forces to be led by a unitary command, the U.S. military began searching for a more reliable IFF system to ensure safety from friendly fire casualties. The most popular device which was proposed, and which was ultimately utilized, consisted of an array of infrared emitting LEDs which provided a constant or rhythmic flash beacon through a full 360 degree field. By placing these devices, which were euphemistically referred to as "Budlites", on tanks, helicopters, and other units, it was possible for individual coalition force units to make autonomous on-site identification of forces which it encountered.

The Budlite system is, however, a crude fix for a complex problem. It is easily understood how such a system could provide an easy target acquisition beacon for a prepared enemy. In addition, despite the fact that the Iraqi forces were entirely unequipped to take advantage of this flaw, fully 25 percent of the casualties incurred by the coalition forces was attributed to friendly fire. On several occasions, the failure of a Budlite element to function properly caused the unit using the faulty element to be confused for an Iraqi force, and to become an unfortunate target when the coalition force viewing them relied too heavily on the missing infrared beacon.

More sophisticated IFF systems, including those integrated with laser targeting and designation devices carry considerable risks of cornea damage to the users. In severe cases retina damage may also result. With added gain in incident light energy associated with the focusing effects of binoculars, radiation damage to the eyes of users can occur even with so-called "eye safe lasers".

It is, therefore, an object of the present invention to provide an IFF device which is portable and decouples the troop identification process from a centralized location.

It is, also, an object of the present invention to provide an IFF device which obviates the need for radio transmissions which could be intercepted, jammed, or otherwise compromised during the course of battle.

It is, further, an object of the present invention to provide a covert IFF device which is selective in its signal transmission so as to minimize the risk that an enemy could identify or locate its source while it is being used.

It is also an object of the present invention to provide a fully eye safe IFF device which may be used to both identify a friendly element in a battlefield environment as well as to communicate information covertly.

SUMMARY OF THE INVENTION

The present invention is an apparatus comprising compact infrared transponder and interrogator devices, each of which are coupleable to digital and/or audio interfacing means, and also to remote processing, communication, and display modules.

More specifically, with respect to pairs of transponder and interrogator devices, each comprises a non-coherent infrared light emitting diode (IR-LED), an AC coupled signal generators and signal processors, semi-reflective optical surfaces, lensing means, spectral filters, and a receiver photodiode. The target transponder, which has a stationary bottom portion and a rotating top portion and is driven by a quick response stepper motor, is initially engaged in a scanning mode so that it may scan through a full 360 degree planar field of view. The transponder is designed, as described more fully with respect to the Figures in the Detailed Description of the Preferred Embodiment, to receive at a receiver photodiode, IR signal light in a first frequency range.

A user, who wishes to identify himself to the vehicle or individuals utilizing the transponder, directs his interrogator device (which is preferably integrated to field binoculars) at the rotating transponder and engages an IR led transmitter to send a signal. This signal is sent out along a narrow angle spread so that it may not easily be intercepted or jammed. The wavelength of the interrogator signal is predetermined, and may be for example 880 nm. The signal comprises a sequence of digital codes which are finely adjusted in both timing and content so that they may not be easily duplicated by random interference or intentional countermeasures.

As the transponder scans the 360 degree field of view, it receives the interrogator signal at a specific position. The signal is processed by a dynamic coupled AC coupled receiver to amplify meaningful signals, to discard noise, and solar saturation. The amplified signal is compared with a predetermined code sequence (which may be determined on a daily basis to ensure secrecy), and if the signal received is correct, the transponder stops rotating and remains directionally stable, locked in line with the interrogator. It is then disengaged from scanning mode, and is alternatively engaged in response mode.

In response mode, the transponder returns a signal at a different, but predetermined wavelength which may be for example 950 nm. The returned signal may be an ID code, or other meaningful information. If either user, at the transponder or interrogator, wishes to engage in voice communications, a VOX signal is transmitted. The audio interfacing means is a standard headset microphone and earpiece which is used for voice communication. A remote processing, communicating, and display module is coupled to the transmitter and receiver elements of the transponder and to the headset of the interrogator. It provides a visual display of what is being received when the device is in a scanning mode, and processes incoming and outgoing signals when the device is used to communicate with another element having a similar device. If the users wish to engage in written transmissions, each module may be equipped with a key pad for sending specific messages which appear as words in the respective viewing means associated with the transponder and interrogator devices.

More particularly, with respect to the transmitting element of the interrogator, an IR-LED is driven by a digital signal voltage source, and therein generates a digital infrared signal at a predetermined wavelength, for example 880 nm. This infrared signal impinges upon a dichroic beam splitter, which reflects a majority of the light at that wavelength (and allows light at 950 nm to pass). Using two wavelengths permits coaxial operation which is desirable for simultaneous transmit and receive functions, and therefore a more compact design. The remaining signal light, at 880 nm, passes through the beam splitter and is absorbed by a straylight trap. The beam which is reflected and directed through a filter and narrow band lens at the end of the optical train, and remains collimated as it emanates from the device.

The receiving features of the transponder device comprise a similar filtering lens, which permits only a portion of the frequency spectrum into the optical train housed within the transponder. The 880 nm light signal, which is emitted by the interrogator, is received at a second dichroic beam splitter, which permits the majority of light at that wavelength to pass, the remainder being reflected out of the path of optically sensitive elements therein. The interrogator signal is then directed through a series of field stops and filters and ultimately directed onto a receiving silicon photodiode, which converts the signal into an electrical input. The electrical input is then analyzed by an AC coupled processor means and dynamic background comparator to determine the meaningfulness of the signal, for example if the signal is a proper recognizable code.

The transmitter of the transponder is similar in most respects to the transmitter of the interrogator, except for the wavelength response of the dichroic beam splitter and the wavelength of the IR-LED transmitter. For example, the IR-LED, which is coupled to the digital signal voltage source, may emit at 950 nm, and the dichroic beam splitter permits IR light at 880 nm to pass, and reflects IR light at 950.

The receiver of the interrogator is correspondingly similar to the receiver of the transponder except for the necessary difference in wavelength response of the dichroic beam splitter.

Other objects and advantages of the invention will be more fully apparent from the ensuing disclosure and appended claims.

DETAILED DESCRIPTION OF THE PREFERRED EMBODIMENT

The present invention, as described herein with reference to the specific embodiments shown in the accompanying drawings, comprises two distinct devices in combination. The first is a transponder which scans for, and responds to, a code signal directed at it; the second is an interrogator which transmits and receives signals from the transponder. Each device includes a similar optical train, having inverse frequency responding elements, a signal transmitter and received signal processing means, voice and word interfacing means. Associated with each device are signal processing elements which comprise further components of the present invention.

External devices, including headset earphone/microphone elements, video monitors, and field binoculars, are integral with the useful function of this invention. Reference to them in the foregoing description will be made to demonstrate how the preferred embodiment may be employed. The present invention, however, is not intended to be limited to combinations including these external devices. It is understood that the novel devices which comprise the present invention may be properly calibrated and/or modified for use with other equivalently functioning external devices without deviating from the scope of this invention.

In use, the transponder device may be affixed to an external surface of a vehicle, such as a helicopter, a tank, or a troop carrier. It is desirable that the position of the transponder be one in which the maximum amount of open range view is provided so that the maximum area may be scanned by the device. In the alternative, the device may be designed to be portable, so that individual soldiers in the field may utilize it as well.

The interrogator device of the present invention is designed to be portable, and in a preferred embodiment is to be integrated with standard issue field binoculars. This preferred embodiment is desirable because the optical train thereof may be aligned with the visual boresight of the binoculars, therein making the alignment of the transmitted signal extremely accurate.

Figure 1:
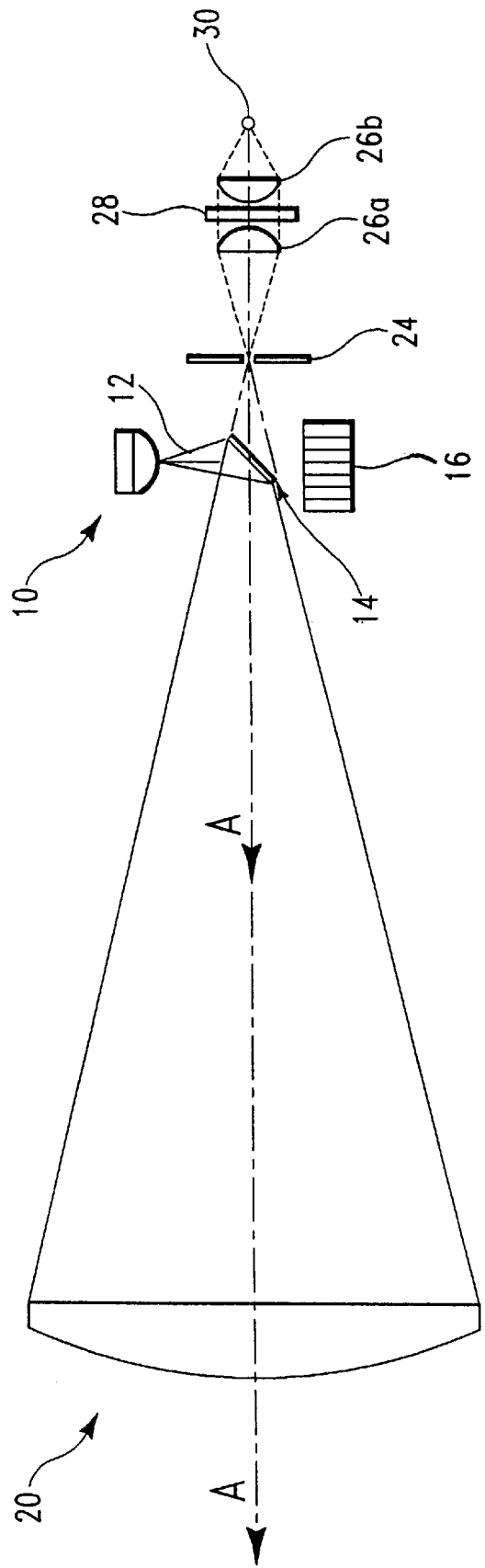
FIG. 1 is a component diagram showing the similar optical train of both the transponder and interrogator of the present invention.
Figure 2:
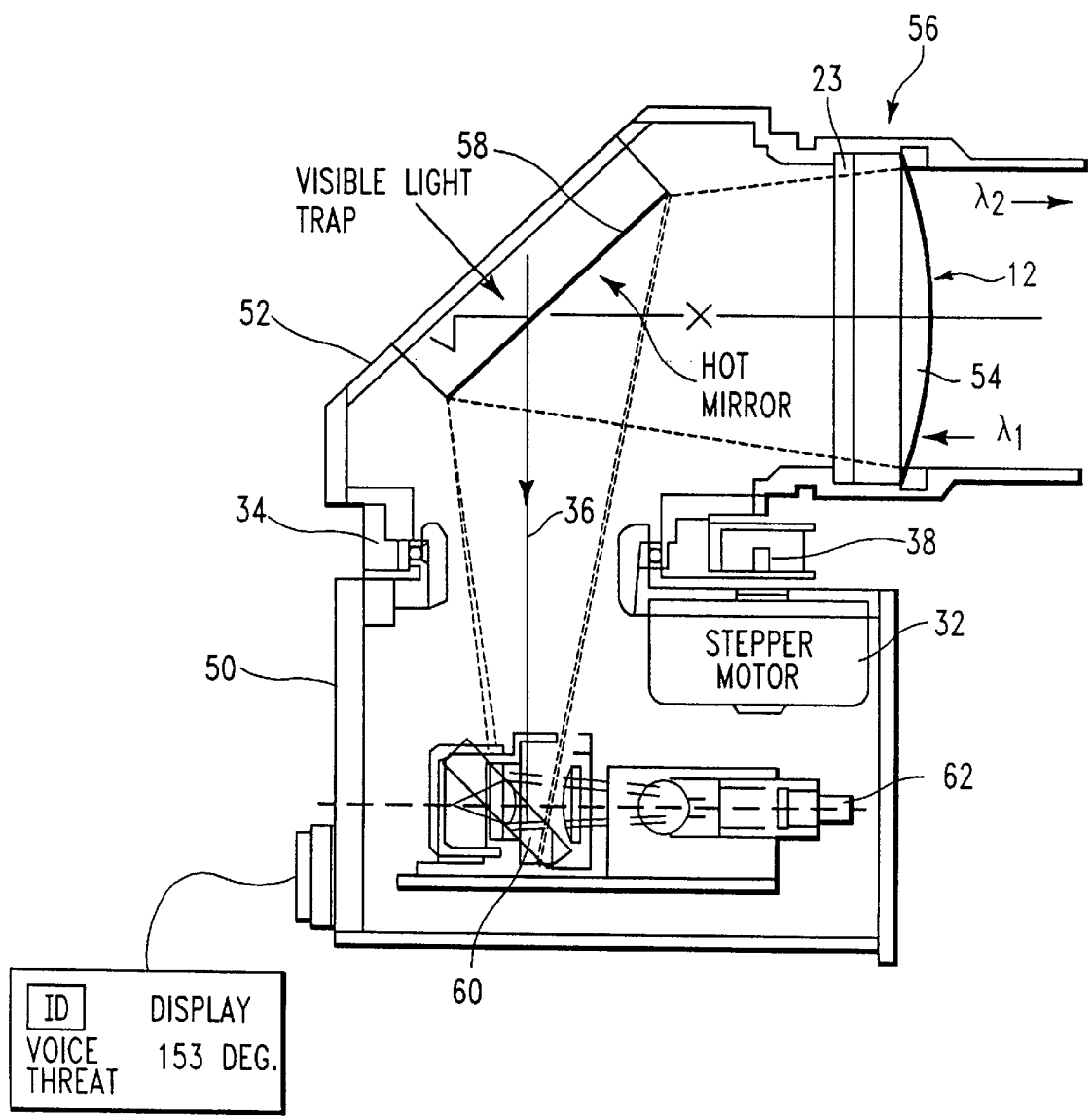
FIG. 2 is a cross sectional component diagram of the transponder device of the present invention.

Referring now to FIGS. 1 and 2, the general optical trains of both the interrogator and transponder devices, respectively, are shown. In order to most clearly illustrate the operational function of this apparatus, the features and functions of the interrogator and transponder shall be explained with respect to the operational sequence.

First with respect to FIG. 2, and the transponder device, the transponder comprises two portions, an stationary lower portion 50, and a selectively rotatable upper portion 52. The upper portion 52 is rotatably mounted to a bearing ring 34 and is selectively actuated to rotate by a stepper motor 32, via a shaft 38. It is understood that the shaft 38 of the stepper motor 32, may engage the upper portion 52 by means of a gearing thereon, or other means whereby rotation of the shaft 38 may cause the upper portion to rotate.

The preferred step rotation rate of the upper portion 52 of the transponder is 1.8 degrees of rotation per 0.015 seconds, which is referred to as the dwell time, therein rotating once per 2 seconds. The stepper motor further provides a constant directional indication signal to the control/processor elements associated therewith, so that when a signal is received, a directional bearing to the transmission source may be continuously maintained. As the transponder has a field of view of 2 degrees, and because security reasons require that the transponder receive multiple correct codes within a given time period, the interrogator must generate multiple inquiry code signals per dwell time. Receipt of the proper predetermined signal causes the immediate disengagement of the stepper motor, and therein permits the transponder to lock onto the interrogator signal source.

Second, with respect to FIG. 1 and the transmission of the above identified initial code signals by the interrogator device, the optical train comprises a first transmitter 10 which is an IR-LED emitter. The IR-LED emitter in the interrogator device, which comprises the transmitter 10 must be relatively strong, preferably emitting at a level which is substantially higher than the background. In addition, the IR-LED emitter must be capable of being pulsed at high levels for extended periods without thermal damage. It is most important, however, that the emitting frequency of the interrogator IR-LED be reflected by the beam splitter of the interrogator, and also correspondingly not be reflected by the beam splitter in the transponder device.

Many different IR-LEDs would function in the present invention, however, a particularly preferred IR-LED for the interrogator device is a standard 880 nm GaAIAs emitter which can provide over 100 mW of continuous eye safe output power. In addition to their superior power output capacity, the 880 nm emitters can operate with less required thermal sinking, having an ambient operating range up to 70.5 degrees celsius. Despite the superior temperature/operability envelope of the 880 nm emitters, GaAIAs emitters still require some small number of cooling means. Some of the suggested cooling solutions are: (1) reducing the emitter's peak output to 35 mW (which is still substantially higher than is necessary for optimal operability); (2) include active cooling means, i.e. fans or thermo-electric cooling; and (3) reduce the emitter's duty cycle from 20 percent to 9 percent. In a preferred embodiment, the low duty cycle solution is selected, as the most practical and desirable balance between bandwidth, duty cycle, dynamic range and digital code signal length has been empirically to be a 9 percent duty cycle.

Figure 5:
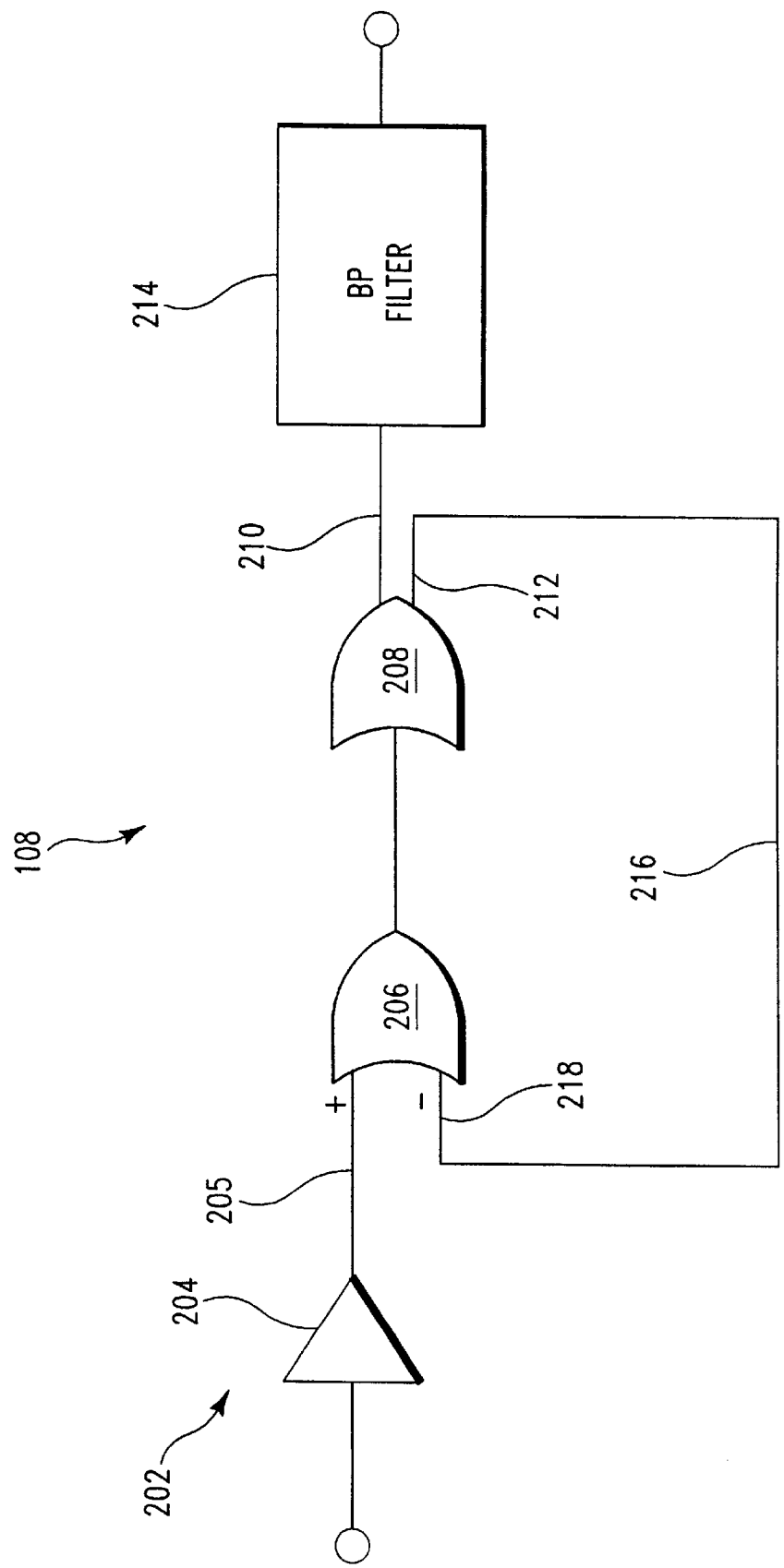
FIG. 5 is a subcircuit diagram of the solar rejection circuit of the processor assemblies of the present invention.

The IR-LED transmitter of the interrogator is coupled to a varying voltage signal source (discussed more fully with respect to the function/controller means shown in FIG. 5) and emits a signal, coded or otherwise, in accordance with actuation by a user. Pulse position logic is utilized instead of pulse code modulation as it is desired for safe LED thermal operation by maintaining a constant duty cycle independent of the code. The initial inquiry codes are emitted in one of four positions of an eight bit sequences, each sequence is transmitted in 675 $\mu$sec. and effectively equals sixteen bits.

The emitted 880 nm frequency digital signal 12 is directed to a dichroic beam splitter 14. In the optical train of the interrogator device, the dichroic beam splitter 14 is designed to reflect 85 percent of light in the frequency range of 880 nm. The remaining 15 percent of the transmitted light, which is not reflected by the beam splitter 14, passes through the beam splitter 14 and is captured by the straylight trap 16 which is positioned in direct line with the emitter beam 12 and the beam splitter 14. This trap minimizes side lobes outside the main beam, thereby limiting detection of the beam to the collimated direction.

The beam splitter 14 is positioned so that the 85 percent of the emitter beam 12 which reflects is directed long axis A to a spectral filter and to lens assembly 20 which is positioned at the exterior aperture of the device. The lens portion of the assembly 20 ensures that the emitted beam 12 diverges as little as possible once it has been transmitted. The filtering function of the assembly 20 is designed to permit light from the interrogator transmitter and the transponder transmitter (a received signal by the interrogator) to pass through, but to reject as much of the out-of-band solar flux as possible.

Referring now, again, to FIG. 2, the 880 nm code signal sequences (the emitted portion of transmitted beam 12) from the interrogator are directed at the spectral filter and lens assembly 56 of the upper portion 52 of the transponder as it rotates. In this embodiment, the filtering lens rejects light outside the narrow frequency band from 880–950 nm. The lens 56 focuses the transmitted incident beam 12 as it passes through. This focused incoming light, is directed to a second dichroic beam splitter 60. Because, when the transponder is in scanning mode the upper portion is rotating with respect to the lower portion, it is necessary to provide a mirror 58, mounted along the optical train, in the upper portion 52, and intermediate between the filtering lens 54 and the second beam splitter 60. The mirror collects the light which passes through the lens as the upper portion rotates, and focuses all of that light onto the beam splitter 60. It is understood that for such a mirror to reflect the light collected in a 360 degree scan onto a single stationary element, with the light always directed along the same axis, the mirror 58 must be aligned at a 45 degree angle to the plane of rotation and be disposed on that same axis.

The second dichroic beam splitter 60, which is mounted in the stationary lower portion 50 of the transponder, is designed to permit 880 nm light pass through directly. The code signals are then directed through a field stop and a series of filters and impinges onto a receiver silicon photodiode. The silicon photodiode converts the incident light signal into electrical impulses which are carried to a processor circuit (described more fully with respect to FIG. 3). If the processor circuit determines that the incoming signal matches the predetermined code, the stepper motor 32 is disengaged and the transponder is locked into the direction of the interrogator.

Once locked into position, the transponder transmits a signal, for example an ID code, which relays to the interrogator that the code signal was received and acknowledged. The transponder transmits this acknowledgment signal by means of an IR-LED 62. The transponder IR-LED 62 is mounted within the lower portion 50 of the transponder device. It is coupled to a signal generating voltage source (described more fully with respect to FIG. 3), and emits a light signal at a wavelength which is different from the interrogator transmitter, for example at 950 nm. A specific transmitter which may be used in the transponder is a Gallium Arsenide IR emitter.

The transponder emitter signal is directed from the transmitter IR-LED, to the second dichroic beam splitter. As stated above, the second beam splitter 60 is designed to allow 880 nm wavelength light pass through so that the incoming signals from the interrogator may be received at the photodiode. The second beam splitter 60, however, is simultaneously designed to reflect a large portion of light having a frequency of 950 nm. Approximately 85 percent of the transponder emitted signal is, therefore, reflected off the second beam splitter 60, and is directed so that it reflects, a second time, off the fold mirror 58 and then is passed through the filter lens 56. The portion of transmitter signal which is not reflected by the second beam splitter 60 passes through the beam splitter and is directed onto a stray light trap which is similar to the stray light trap 16 shown in FIG. 1, so that it does not flood its own photodiode with its own signal.

The transponder's emitted response signal is received by the interrogator device in a manner which is similar to the way in which the transponder initially received the interrogator code signal, except that the signal does not have to engage a rotating and scanning device. More specifically, referring again to FIG. 1, the transponder response signal is received by the interrogator through filter lens 20 which directs the signal beam onto the first beam splitter 14. The beam splitter 14, as stated previously, reflects 880 nm light, but permits 950 nm wavelength light, which is the wavelength of the transponder's signal, to pass through. The transponder signal is then directed through a set of field stops 24 and second stage spectral filtering lenses 26a,26b. The spectral filtering lenses 26a,26b are include to further remove any stray light which might provide noise outside the desired and predetermined frequency range of the incoming transponder signal, and also to reimage the light. The received light is reimaged for two reasons. First, the reimaging technique allows the accurate definition of the active field of view with only the combination of lenses 26a and 26b and the field stop 24. This allows for greater insulation against out-of-field sources such as the sun, jammers, heat sources emitting in the same range. Second, reimaging provides the collimated space necessary for the receiver's final spectral filter 28. In total, the field stop 24 and reimaging lenses 26a and 26b ensure that the specific point of signal emanation may be identified, and permit highly accurate aligning of the device so that a visual sighting may be made with binoculars, night goggles, or other sight amplification device.

The transponder signal is ultimately directed onto a receiver silicon photodiode 30 which is substantially similar to the photodiode of the transponder. The photodiode 30 takes a received light impulse and converts it to an electrical signal. The way in which the signal is analyzed and is converted to a form which is compatible for a user to understand is determined by the mode which the users mutually decide. During initial interrogation and response, the mode necessarily must be predetermined so that both the interrogator and transponder may communicate meaningfully. This predetermined mode may, preferable be a set of digitally transmitted ID codes which ultimately appear in visual form in an eyepiece of the interrogator's binoculars, or on an alphanumeric display coupled to the transponder device. As shown in the embodiment shown in FIG. 2, the alphanumeric display of the transponder may be remotely coupled to the transponder device; this being useful for helicopters and other large vehicles on which the transponder may be positioned on a surface which is not feasibly observable by a user. The alphanumeric display shown in FIG. 2 shows some standard types of information, which may be for example the compass direction along which the interrogator is transmitting, the ID number of the interrogator, the mode of communication (described more fully hereinbelow) requested, and a threat warning code.

After the initial volley of signals, the two users may continue communicating at a basic mode, transmitting and receiving basic preset information in the base mode. If more detailed and/or specific information is requested, one of the two users may request that the communication be shifted to a higher mode, in which each user may transmit keyed in alphanumeric data via a keypad or other means. Keyed in data is visually displayed in the eyepiece, or the display of the receiving user. If the users decide that the rate of information transfer is too slow, or otherwise undesirable, the users may engage in audio communication via headsets, or other microphone/speaker devices. It is understood that transmission of vocal communications requires a data transmission rate which is relatively high. The data emission rate of the digital transmitters described above are sufficient to provide clearly articulated vocal messages. Therefore, vocal communication is carried out via analog transmission.

Figure 3:
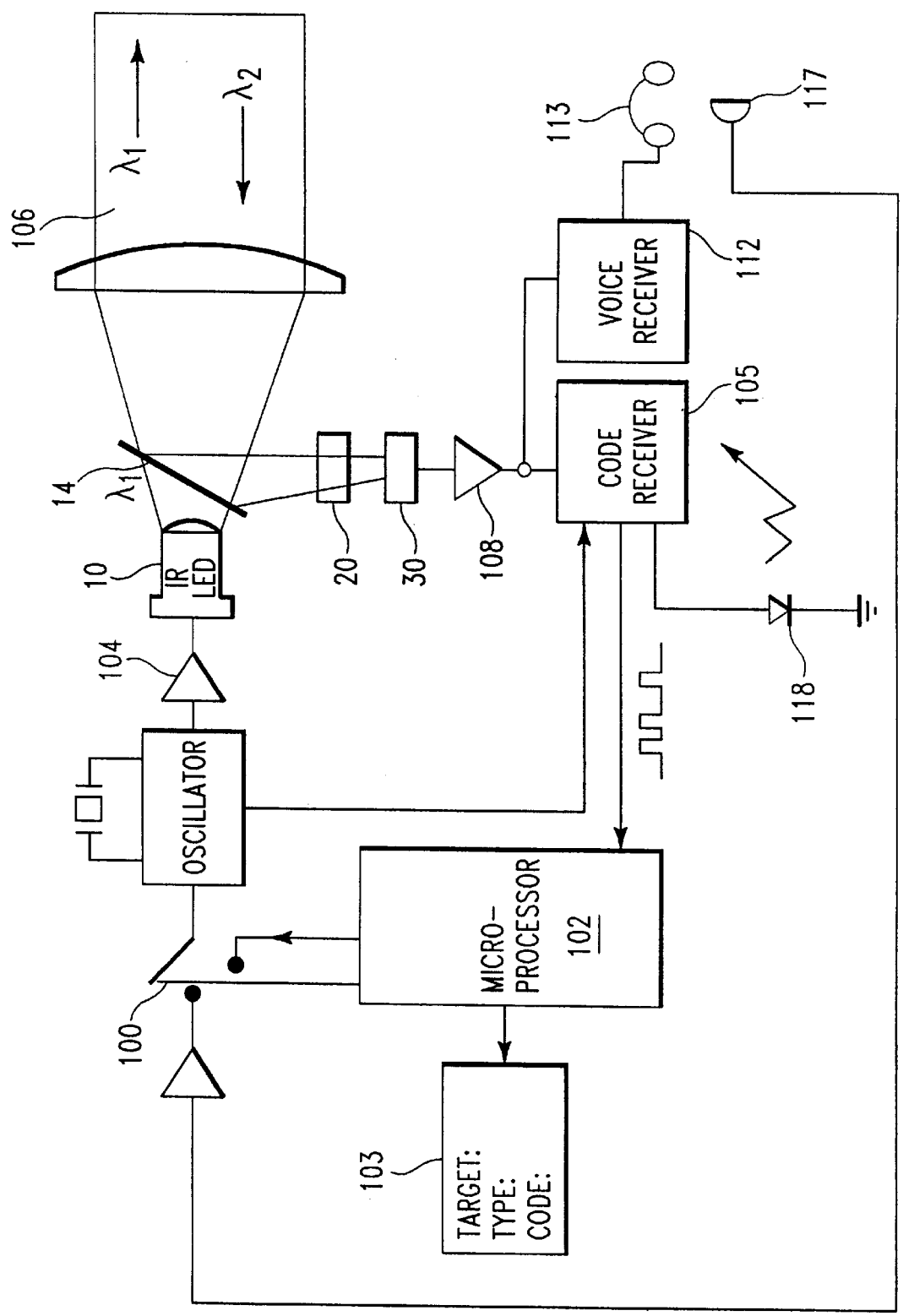
FIG. 3 is a diagram of the function/control means of the interrogator device and associated processor assemblies of the present invention.
Figure 4:
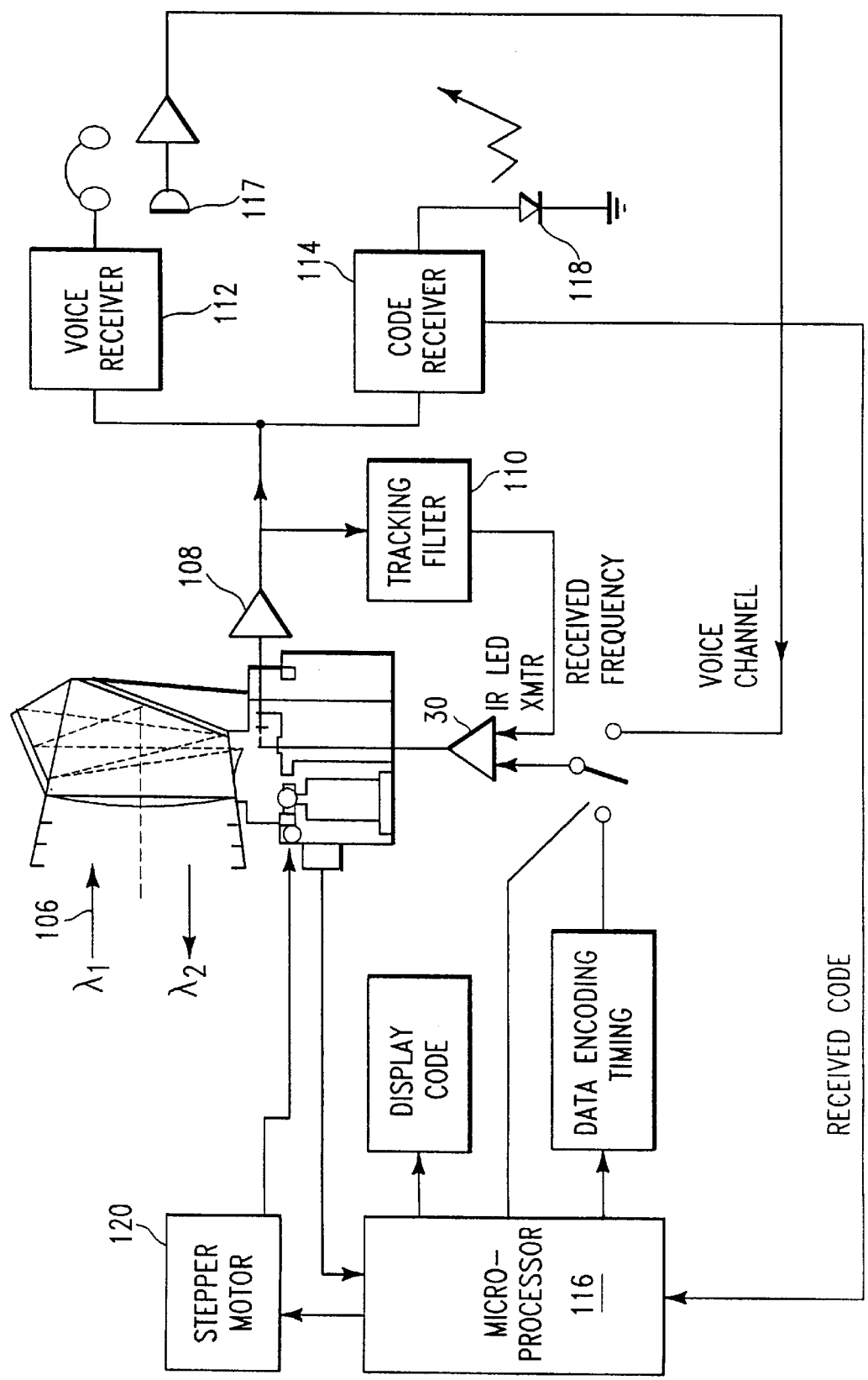
FIG. 4 is a diagram of the function/control means of the transponder device of the present invention.

Referring now to FIGS. 3 and 4, a diagram of the function/control elements of the interrogator and transponder devices, respectively, and the processor assemblies associated therewith, are provided. The description of these function/control elements shall be described, as were the component elements of the interrogator and transponder devices, with respect to the operation of the devices in the field. First with respect to the interrogator's transmission of the initial code. The mode switch 100 is initially set to code signal mode, to initiate contact with the scanning transponder. The microprocessor 102 encodes a properly timed code signal, which includes a repeated code sequence comprising effective 16 bits of information.

The code signal must include a sufficient number of repeated sequences so that the transponder may receive a large number of them within one dwell time. This is necessary for the purposes of valid code identification as for example three out of five received sequences must contain the proper time, spacing and content of a predetermined proper signal. It is understood that a three out of five requirement for code signals provides sufficient insulation against erroneous or noise related false identifications.

The repeated code sequences which are produced by the processor 102 are transmitted to the power transmitter 104 (which is a rapidly varying voltage source) which produces a driver signal for the 880 nm IR-LED. Code signal 106 (designated in FIGS. 3 and 4 as ray lambda 1) is directed outward through the first dichroic beam splitter 14 (the physical orientation of the IR-LED in FIG. 1 shows the embodiment comprising a beam splitter 14 which reflects the emitted beam 106) and out of the interrogator device.

Referring now to FIG. 4, the digital code signal 106 is received by the transponder, and the signal is directed onto the receiver photodiode therein (see FIG. 2). The receiver photodiode produces an electrical current carrying the signal to a solar noise rejection subcircuit 108 (described herein with reference to FIG. 5). Once the DC component of solar input noise is filtered by the rejection subcircuit, the signal is directed to a tracking filter 110 and to a dual line which includes the voice receiver 112 and the code receiver 114.

When the transponder is in a scanning mode, the electrical signal path of interest is to the code receiver 114. As stated above, the initial code signal is compared with the predetermined proper code sequence. If three out of five are compared and found to be valid, the code is transmitted to the transponder microprocessor 116. The code receiver, further, activates a signal detection LED 118 for the purposes of identifying to an observing user that incoming information is being detected.

The transponder microprocessor 116 receives the code signal, which has been identified by the code receiver 114, and simultaneously coordinates the actions of several different elements. First, the microprocessor 116 causes the driver 120 for the stepper motor 32 to stop the rotation of the upper portion of the transponder, thereby shifting the transponder into communication mode from scanning mode. The stepper motor 32, as stated previously, produces a directional indicating signal which may be selectively monitored by the microprocessor 116. Once a properly identified code signal has been received and identified, the microprocessor 116 utilizes the directional input from the stepper motor and produces a visual display which includes the direction location to the transmission source.

Second, the microprocessor 116 produces a predetermined response signal, for example an ID code, which is to be transmitted back to the interrogator. This response data stream is produced at a given timing sequence and is directed to a voltage signal supply 30 which actuates the IR-LED. The IR-LED (950 nm emitter) emits the response signal (designated as ray lambda 2) to the interrogator.

Referring, again, to FIG. 3, the response signal lambda 2 is received by the receiver photodiode and is converted into an electrical signal. The electrical signal is initially processed by a solar rejection subcircuit (described more fully with respect to FIG. 5) which removes the DC component of the solar noise. The code is received by the code receiver demodulator which, in turn, transmits the processed signal to the first microprocessor 102. In addition, the code receiver demodulator may be coupled to a signal detection LED, which is lit upon receipt of a response signal from the transponder.

In response to the signal received, the first microprocessor 102 produces an output signal to a display 103, for example a miniature LED display inside the eyepiece of the field binoculars, which reports the information encoded in the transponder response signal. For example, this information may include the target position, the type of vehicle, the ID code of the individual using the transponder, or a variety of other predetermined information.

Once the user of the interrogator device has received the digitally encoded response signal from the transponder, he may wish to engage in vocal communication with the user of the transponder. In this case, the user of the interrogator physically alters the mode of the transmission and reception subassembly, such as by depressing a switch mounted to the exterior of the binoculars. This act causes the interrogator transmitter to emit a signal to the transponder requesting audio communication. In addition, a signal carrying the information concerning the mode switch is transmitted to the code receiver demodulator. In response to the information concerning the change in mode, the code receiver demodulator 105 switches the incoming received signal path to a voice receiver processor 112 which in turn provides an audio signal to a speaker, for example a pair of headphones 113.

Referring again to FIG. 4, receipt of a request to communicate with audio input is displayed by the second microprocessor 116 on the video display (see FIG. 2). The transponder user may physically switch the transmitted signal to a voice channel mode, or the second microprocessor 116 may automatically shift modes, depending upon the desired variation.

In response to the receipt of a request for audio communication, if it is desired, the transponder user may speak through a microphone 117, which is converted into an analog electrical signal by a standard means. This signal is directed to the voltage signal supply, a voice driver, and is transmitted by the transponder IR-LED. It is understood that the voltage signal supplies which drives the IR-LED transmitters of both the interrogator and the transponder must be able to function as both a digital supply for the sequences produced by the microprocessors and also as an analog supply for the audio input. The audio output is transmitted by the transponder and interrogator as a modified frequency modulated signal. The present restrictions associated with IR-LED performance, with respect to data transmission rates and duty cycle, however, limit the frequency bandwidth of the audio output to below 3,000 kilohertz. It is understood that, while 3,000 kilohertz is more than sufficient for clear and meaningful communications along an audio channel, it is desirable to increase the bandwidth. Subsequent advances in bandwidth performance, as well as power and duty cycle, of IR-LEDs are anticipated, and may be preferable as a superior emitters for use in the present invention.

Referring again to FIG. 3, when the interrogator receives the modified frequency modulated signal carrying the audio response signal from the transponder user, the signal is processed to remove the solar noise component, and is subsequently directed to a voice receiver audio processor 112. The audio processor converts the voice signal into an audio signal which may be heard through a set of headphones 113.

Referring now to FIG. 5, the solar rejection circuit 108 which permits accurate extraction of the meaningful IR data stream is shown. A variety of signal processing techniques may be employed in this function, however, the circuit described hereinbelow is preferred. In order to provide the purest signal, optical filtering of the incoming signal narrows the bandwidth of the signal which reaches the photodiodes. Once the optically filtered signal reaches the photodiode and is converted to an electrical signal, however, there is still a steady sunlight component in the narrow bandwidth which must be extracted. The circuit 108 comprises an input lead 202 which includes a front end diode 204. The signal coming into the circuit through the input lead 202 and front end diode 204 is referred to as the raw data stream. The raw data stream is directed through the positive input 205 of a preamplifier 206 and into a high pass filtering amplifier 208. The outputs 210,212 of the high pass filtering amplifier are directed to a bandpass filter 214 which is tuned to the frequency of properly pulsed data, and to a feedback loop 216 respectively. Output 210 comprises the AC component of the original raw data stream, which is of course the meaningful component which originated at the opposing interrogator or transponder device.

The second output 212 of the high pass filtering amplifier 208 includes the DC component of the raw data signal, which DC component corresponds to the relatively constant solar (or other environmental feature) background radiation. The output 212 is directed back, in a feedback loop 216 to the negative input 218 of the preamplifier 206. By coupling the DC component of the signal to the negative input 218, the DC component is effectively subtracted from the signal. This feedback mechanism provides excellent filtering for the accurate extraction and subsequent amplification of the AC component.

While several embodiments of the present invention have been shown and described, it is to be understood that many changes and modifications may be made thereunto without departing from the spirit and scope of the invention as defined in the appended claims.

We claim:

1. An infrared identification and communication assembly, including at least two devices, each of which comprises:

a housing having a light receiving opening therein;

a spectral filter, mounted within said light receiving opening, which permits a frequency bandwidth of incident light to enter into and exit from said housing, said bandwidth including first and second frequencies, wherein one of said first and second frequencies comprises a transmitted frequency and the other of the first and second frequencies comprises a received frequency;

a dichroic beam splitter, mounted in optical receiving alignment with said spectral filter, for reflecting and passing therethrough selected portions of said frequency bandwidth, wherein said selected portions which are reflected include one of said first and second frequencies, and said selected portions which pass therethrough include the other of the first and second frequencies;

a photodiode, mounted in optical receiving alignment with said dichroic beam splitter, for receiving said received frequency, and converting same into a first electrical signal;

a solar noise rejection circuit, through which circuit the first electrical signal is directed, which includes a pair of amplifiers coupled via a feedback loop whereby constant level solar noise components of the first electrical signal are subtracted therefrom;

means by which a user may produce a second electrical signal; and a light emitting diode, aligned in light transmitting alignment with said dichroic beam splitter, for converting said second electrical signal into a light signal comprising the transmitted frequency, and emitting said light signal through said spectral filter and out of said housing in a narrow beam.

2. The assembly as set forth in claim 1, wherein said frequency range of light which is directed by the beam splitter of the transponder, to the photodiode thereof, comprises at least a portion of the frequency range of the light emitted by the light emitting diode of the at least one interrogator; and wherein the frequency range which is directed by the beam splitter of the interrogator, to the photodiode thereof, comprises at least a portion of the frequency range of the light emitted by the light emitting diode of the transponder.

3. The assembly as set forth in claim 1, further comprising a means for decoding said first electrical signal into an easily understandable form.

4. The assembly as set forth in claim 3, wherein said means for decoding comprises a microprocessor.

5. The assembly as set forth in claim 4, wherein said light emitting diodes emit light in the infrared range.

6. The assembly as set forth in claim 5, wherein at least one of said light emitting diodes comprises a gallium arsenide (GaAs) infrared emitting diode.

7. The assembly as set forth in claim 5, wherein at least one of said light emitting diodes comprises a GaAlAs infrared emitting diode.

8. The assembly as set forth in claim 1, wherein said housing of said transponder device further comprises an upper and a lower portion, said upper portion including said spectral filter and a reflecting mirror, said filter being oriented along a first axis, said lower portion of said housing including said dichroic beam splitter, said photodiode, and said light emitting diode, said dichroic beam splitter being oriented along a second axis, wherein said upper portion and said first axis are rotated relative to the lower portion, by a stepper motor through a 360 degree scanning field, and wherein said reflecting mirror maintains the optical alignments of the dichroic beam splitter and the spectral filter.

9. The assembly as set forth in claim 4, further comprising means for displaying said decoded information of said first electrical signal in a manner which is understandable by a user.

10. The assembly as set forth in claim 9, wherein said means for displaying the information comprises a video display.

11. The assembly as set forth in claim 1, wherein said means by which a user may produce a second electrical signal comprises a microphone.

12. The assembly as set forth in claim 1, wherein said means by which a user may produce a second electrical signal comprises a keyboard and microprocessor interface.

13. An interrogator device comprising:

a housing having a light receiving opening therein;

a spectral filter, mounted within said light receiving opening, which permits a specific frequency bandwidth of incident light to enter into and exit from said housing, said bandwidth including a first frequency for transmission and a second frequency for reception;

a dichroic beam splitter, mounted in optical receiving alignment with said spectral filter, for reflecting and transmitting selected portions of said specific frequency bandwidth;

a photodiode, mounted in optical receiving alignment with said dichroic beam splitter, for receiving one of said selected portions which includes said second frequency, and converting same into a first electrical signal;

a solar noise rejection circuit, through which circuit the first electrical signal is directed, which includes a pair of amplifiers coupled via a feedback loop whereby constant level solar noise components of the first electrical signal are subtracted therefrom;

means by which a user may produce a second electrical signal; and a light emitting diode, aligned in light transmitting alignment with said dichroic beam splitter, for converting said second electrical signal into an emitted light signal which comprises the first frequency range within said specific frequency bandwidth, and emitting said light signal through said spectral filter and out of said housing in a narrow beam.

14. The device as set forth in claim 13, wherein the device is mounted within the optical sight of a pair of binoculars.

15. The device as set forth in claim 13, wherein the light emitting diode comprises a GaAlAs element.

16. A transponder device comprising:

a housing having a light receiving opening therein;

a spectral filter, mounted within said light receiving opening, which permits a specific frequency bandwidth of incident light to enter into and exit from said housing, said bandwidth including a first frequency for transmission and a second frequency for reception;

a dichroic beam splitter, mounted in optical receiving alignment with said spectral filter, for reflecting and transmitting selected portions of said specific frequency bandwidth;

a photodiode, mounted in optical receiving alignment with said dichroic beam splitter, for receiving one of said selected portions which includes said second frequency, and converting same into a first electrical signal;

means by which a user may produce a second electrical signal;

a light emitting diode, aligned in light transmitting alignment with said dichroic beam splitter, for converting said second electrical signal into an emitted light signal which comprises the first frequency range within said specific frequency bandwidth, and emitting said light signal through said spectral filter and out of said housing in a narrow beam;

said housing further comprising an upper and a lower portion, said upper portion including said spectral filter and a reflecting mirror, said filter being oriented along a first axis, said lower portion of said housing including said dichroic beam splitter, said photodiode, and said light emitting diode, said dichroic beam splitter being oriented along a second axis, wherein said upper portion and said first axis are rotated relative to the lower portion, by a stepper motor through a 360 degree scanning field, and wherein said reflecting mirror maintains the optical alignments of the dichroic beam splitter and the spectral filter.

17. The device as set forth in claim 16, wherein the light emitting diode comprises a GaAs element.

18. The device as set forth in claim 16, wherein said housing further comprises a selectably rotating portion which includes the light receiving opening such that the transponder may scan for, and receive light from, a wide angular field.

19. The transponder device as set forth in claim 18, further comprising means for selectively rotating said rotating portion to scan for a signal of the second frequency and a source of same, and means for stopping said rotating portion, in directional alignment with said source.

20. A covert communication device, comprising at least one interrogator device and at least one transponder device, wherein each of said interrogator devices comprises:

a housing having a light receiving opening therein;

a spectral filter, mounted within said light receiving opening, which permits a specific frequency bandwidth of incident light to enter into and exit from said housing, said bandwidth including a first frequency for transmission and a second frequency for reception;

a dichroic beam splitter, mounted in optical receiving alignment with said spectral filter, for reflecting and transmitting selected portions of said specific frequency bandwidth;

a photodiode, mounted in optical receiving alignment with said dichroic beam splitter, for receiving one of said selected portions which includes said second frequency, and converting same into a first electrical signal;

means by which a user may produce a second electrical signal; and a light emitting diode, aligned in light transmitting alignment with said dichroic beam splitter, for converting said second electrical signal into an emitted light signal which comprises the first frequency range within said specific frequency bandwidth, and emitting said light signal through said spectral filter and out of said housing in a narrow beam, and wherein each of said at least one transponder devices comprises:

a housing having a light receiving opening therein;

a spectral filter, mounted within said light receiving opening, which permits a specific frequency bandwidth of incident light to pass into and out of said housing, said bandwidth including a first frequency for transmission and a second frequency for reception;

a dichroic beam splitter, mounted in optical receiving alignment with said spectral filter, for reflecting and transmitting selected portions of said specific frequency bandwidth;

a photodiode, mounted in optical receiving alignment with said dichroic beam splitter, for receiving one of said selected portions which includes said second frequency, and converting same into a first electrical signal;

means by which a user may produce a second electrical signal; and a light emitting diode, aligned in light transmitting alignment with said dichroic beam splitter, for converting said second electrical signal into an emitted light signal which comprises the first frequency range within said specific frequency bandwidth, and emitting said light signal through said spectral filter and out of said housing in a narrow beam, wherein said housing further comprises an upper and a lower portion, said upper portion including said spectral filter and a reflecting mirror, said filter being oriented along a first axis, said lower portion of said housing including said dichroic beam splitter, said photodiode, and said light emitting diode, said dichroic beam splitter being oriented along a second axis, wherein said upper portion and said first axis are rotated relative to the lower portion, by a stepper motor through a 360 degree scanning field, and wherein said reflecting mirror maintains the optical alignments of the dichroic beam splitter and the spectral filter.

21. The covert communication device as set forth in claim 20, wherein said transponder further comprises means for selectively rotating said upper portion to scan for a signal of the second frequency and a source of same, and means for stopping said upper portion, in directional alignment with said source.

22. The covert communication device as set forth in claim 21, further including a microprocessor which controls said means for selectively rotating and said means for stopping said upper portion in accordance with the reception and identification of a specific code.

23. An infrared identification and communication assembly, including at least two devices, each of which comprises:

a housing having a light receiving opening therein;

a spectral filter, mounted within said light receiving opening, which permits a frequency bandwidth of incident light to enter into and exit from said housing, said bandwidth including first and second frequencies, wherein one of said first and second frequencies comprises a transmitted frequency and the other of the first and second frequencies comprises a received frequency;

a dichroic beam splitter, mounted in optical receiving alignment with said spectral filter, for reflecting and passing therethrough selected portions of said frequency bandwidth, wherein said selected portions which are reflected include one of said first and second frequencies, and said selected portions which pass therethrough include the other of the first and second frequencies;

a photodiode, mounted in optical receiving alignment with said dichroic beam splitter, for receiving said received frequency, and converting same into a first electrical signal;

means by which a user may produce a second electrical signal;

a light emitting diode, aligned in light transmitting alignment with said dichroic beam splitter, for converting said second electrical signal into a light signal comprising the transmitted frequency, and emitting said light signal through said spectral filter and out of said housing in a narrow beam;

wherein one of the devices comprises a transponder device and said housing of said transponder device further comprises an upper and a lower portion, said upper portion including said spectral filter and a reflecting mirror, said filter being oriented along a first axis, said lower portion of said housing including said dichroic beam splitter, said photodiode, and said light emitting diode, said dichroic beam splitter being oriented along a second axis, wherein said upper portion and said first axis are rotated relative to the lower portion, by a stepper motor through a 360 degree scanning field, and wherein said reflecting mirror maintains the optical alignments of the dichroic beam splitter and the spectral filter.

* * * * *